3,663,641
REMOVAL OF OXYGENATED COMPOUNDS FROM UNSATURATED HYDROCARBONS
Donald O. Hanson, Bartlesville, Okla., assignor to Phillips Petroleum Company
No Drawing. Filed Sept. 18, 1970, Ser. No. 73,583
Int. Cl. C07c 7/00
U.S. Cl. 260—681.5          3 Claims

ABSTRACT OF THE DISCLOSURE

Oxygenated materials are removed from unsaturated hydrocarbons; for example, carbonyls are removed from a butadiene stream containing them by a liquid-liquid phase water wash at a temperature below of the order of about 32° F. Freezing point depressants, such as alcohol, glycol, etc., can be added to avoid ice formation.

---

This invention relates to the removal of oxygenated materials from unsaturated compounds. More specifically, this invention relates to the production of butadiene. More particularly, it relates to the purification of butadiene. Still further, it relates to purification of butadiene which can be obtained by oxidative-dehydrogenation to remove therefrom oxygenated compounds, e.g., carbonyls.

In one of its concepts this invention provides a process for the preparation of unsaturated hydrocarbons, more specifically to obtain them substantially completely free of oxygenated materials or compounds by liquid-liquid water wash at a temperature of the order of about 32° F. and below. In another of its concepts the invention provides a process as described herein, wherein a butadiene stream containing oxygenated compounds is purified by a water wash as described. Still further, in one of its concepts the invention provides a process for removing carbonyls from butadiene in a liquid-liquid phase water wash at a temperature of the order of about 32° F. and below; to avoid ice formation, freezing point depressants such as alcohol or glycol or other depressant can be employed in the water wash.

In Ser. No. 829,256 filed June 2, 1968, now Pat. No. 3,536,775 issued Oct. 27, 1970. Thomas Hutson, Jr., there is described and claimed a process for removing oxygen and oxygenated materials from unsaturated hydrocarbons by a water wash treatment. The water wash treatment is in effect a scrubbing accomplished as in a packed column. Various kinds of water, for example, pure water or water reasonably low in oxygen and capable of removing oxygen and oxygenated compounds from the streams treated can be used. Boiler blowdown water can also be used for the scrubbing. The disclosure of said application for patent is incorporated herein by reference.

I have now discovered that the water washing of unsaturated hydrocarbons to remove oxygen or oxygenated compounds therefrom, e.g., carbonyls can be made materially more effective with consequent savings in utilities and investment costs amounting up to approximately one half by water washing in liquid-liquid phase contact such a stream as herein disclosed at a temperature of the order of about 32° F. or below. Thus, I have found that as the temperature is lowered the ratio of oxygenated material in water phase to that in the unsaturated hydrocarbon or butadiene containing phase increases, i.e., as the ratio goes up there is more carbonyl oxygenated material in the water phase and correspondingly less oxygenated material in the butadiene phase.

It now appears that the number of stages, required to reduce acetaldehyde in 1,3-butadiene phase to 20 parts per million, can be materially reduced according to my findings. The following table shows results of calculations made assuming constant absorption factor, $A$ equals $L/KV$.

| Temperature, °F. | Water/HC mole ratio | Number of stages |
|---|---|---|
| 32 | 3.1 | 6 |
| 77 | 5.6 | 6 |
| 77 | 3.1 | 12.5 |

Referring to the above table, it will be noted that a water/hydrocarbon mole ratio of 3.1 is a weight ratio of 1.

Since liquid-liquid contacting stages tend to be inefficient, 6–12 ideal stages may ordinarily require 25 to 50 real stages. Holding the number of stages constant at 6, and dropping the temperature from 77° to 32° F. reduces the water requirement by a factor of 5.6/3.1=1.8. Holding the water/hydrocarbon ratio at 3.1, only 6 ideal stages are required at 32° F. as compared to 12.5 stages at 77° F. Thus, the great savings in utilities or investment costs amounting to approximately one half can be obtained by operating at 32° F. rather than, say, room temperature.

It is known that carbonyls in 1,3-butadiene-containing streams act as catalyst poisons in ensuing polymerization steps as in the production of polymerized butadiene or copolymers of butadiene and another polymer.

An object of this invention is to provide for the removal of oxygenated materials from unsaturated hydrocarbons. Another object of the invention is to provide a process for the removal of oxygenated materials from a 1,3-butadiene containing stream. A further object of the invention is to provide a more economical water washing of an unsaturated hydrocarbon containing stream to remove oxygenated materials therefrom. A still further object of the invention is to provide a process for removing carbonyls from, say, a butadiene stream containing the same with amounts of water considerably reduced over those heretofore needed.

Other aspects, concepts, objects and the several advantages of the invention are apparent from a study of this disclosure and the claims.

According to the present invention, oxygenated materials are removed from an unsaturated hydrocarbon stream containing same by a liquid-liquid water washing or contact of the stream at a relatively low temperature of the order of about 32° F. or lower and when necessary addition to the water a freezing point depressant, such as an alcohol or glycol.

The water which is used for the water wash in liquid-liquid phase can be any water suited to the purpose. Pure water, boiler blowdown water and other waters can be used. A concept basic to this invention is that as the temperature is lowered, as has been discovered by me, the solubility if the oxygenated compound, e.g., carbonyl increases in the water phase while it decreases in the hydrocarbon phase. Thus, operation of the extraction column as low as the ice point will increase the distribution coefficient K in favor of removal by the water stream. Even lower temperatures can be reached as indicated by use of an alcohol e.g., methanol, ethanol or a glycol, e.g., ethylene-glycol or diethylene glycol. Only that amount of freezing point depressant will be used which does not materially increase the solubility of the hydrocarbon in the water stream albeit some recovery of hydrocarbon in the water stream can be tolerated in favor of obtaining the remainder of the hydrocarbon substantially purified of the undesired oxygenated material.

Other oxygenated compounds which become more soluble in water relative to hydrocarbon upon decrease in temperature below ambient temperatures are: Ethanol, n-propanol, iso-propanol, propionaldehyde, n-butyraldehyde, acetone, methyl ethyl ketone, di ethyl ketone, di-methoxy-methane, di-methoxy-ethane.

A hydrocarbon stream to which the invention is particularly applicable has the following approximate composition. Obviously, the invention is not limited thereto:

| | Mol percent |
|---|---|
| Propylene | 0.93 |
| Isobutane | 0.58 |
| n-Butane | 5.97 |
| Neopentane | 0.70 |
| Isobutene | 0.40 |
| Butene-1 | 30.57 |
| t-Butene-2 | 33.36 |
| c-Butene-2 | 26.33 |
| Butadiene | 0.78 |
| Other | .3 |

The foregoing stream is supplied at a rate of 600 lbs./hr., together with 5,218 pounds per hour of steam and 14,197 s.c.f.h. air to a reactor. In the reactor, oxidative dehydrogenation takes place forming a butadiene stream which has an approximate analysis as follows:

| | Mol percent |
|---|---|
| Isobutene | 0.02 |
| Oxygen | 5.71 |
| Nitrogen | 67.18 |
| Carbon monoxide | 1.17 |
| Carbon dioxide | 1.60 |
| n-Butane | 1.52 |
| Neopentane | 0.18 |
| Butene-1 | 1.00 |
| t-Butene-2 | 3.33 |
| c-Butene-2 | 2.11 |
| Butadiene | 15.51 |
| Other impurities | .4 |

It will be evident to one skilled in the art in possession of this disclosure that a basic concept of the invention is practiced whenever the water wash at the low temperature is applied to a stream as herein disclosed, whether it be a reactor effluent stream or a butadiene product stream.

EXAMPLE I

Washing of acetaldehyde from 1,3-butadiene at 32° F.

One hundred moles of 1,3-butadiene containing 1.7 moles of acetaldehyde are contacted countercurrent to 310 moles of pure water in a packed tower having 6 theoretical stages. The experimental data show that the distribution coefficient $$K = \frac{\text{moles acetaldehyde in butadiene phase}}{\text{moles acetaldehyde in water phase}} = 1.075$$

at this temperature and concentration level. It will be sufficiently accurate for purposes of illustration to assume that K remains constant throughout the contacting device. Then a constant absorption factor, A, can be calculated:

$$A = L/VK = 310/(100)(1.075) = 2.88$$

where L=moles of water; V=moles of hydrocarbon.

The well-known absorption factor method can be used to calculate the extent of carbonyl removal.

$$\frac{Y_{n+1} - Y_1}{Y_{n+1} - Y_0} = \frac{A^{n+1} - A}{A^{n+1} - 1}$$

where $Y_{n+1}$ = acetaldehyde in feed butadiene, 0.017 moles/mole of $C_4$
$Y_1$ = acetaldehyde in product butadiene
$Y_0$ = 0 since the water is free of carbonyl
$n$ = number of theoretical stages.

Carrying through this calculation with $Y_{n+1}=0.017$, $n=6$, $A=2.88$, a value of .000020 is obtained for $Y_1$.

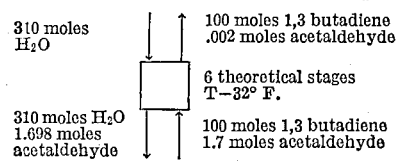

EXAMPLE II

Washing of acetaldehyde from 1,3-butadiene at 77° F.

One hundred moles of 1,3-butadiene containing 1.7 moles of acetaldehyde are contacted countercurrent to 558 moles of water at 77° F. in a tower similar to that used in Example I. The distribution coefficient at 77° F. is K=1.94; hence, A=558/(100) (1.94)=2.88. Since A is the same as in Example I, the same degree of separation will be achieved with the use of 558 moles of wash water compared to 310 moles at 32° F. By the same methods, it can be shown that 12 theoretical stages are required to reduce the acetaldehyde to 0.000020 mole fraction at 77° F. and at a ratio of 310 moles of water per mole of 1,3-butadiene.

Summarizing the foregoing past two conditions for reduction of acetaldehyde to 0.00002 mole fraction in the 1,3-butadiene:

| Temperature, ° F. | Moles of water per 100 moles 1,3-butadiene | Number of theoretical stages |
|---|---|---|
| 32 | 310 | 6 |
| 77 | 558 | 6 |
| 77 | 310 | 12.5 |

Reasonable variation and modification are possible within the scope of this disclosure and the appended claims to the invention, the essence of which is that water washer of unsaturated hydrocarbons to remove oxygen or oxygen containing compounds therefrom, e.g., carbonyls can be made more effective with substantial savings by a liquid-liquid phase water washing of the hydrocarbons at a temperature of the order of about 32° F. or below.

I claim:

1. A process for the removal of oxygen or oxygenated material from an unsaturated hydrocarbon produced under conditions yielding said material which comprises contacting said hydrocarbon in liquid phase with water at a temperature of the order of about 32° F. or below.

2. A process according to claim 1 wherein the hydrocarbon is an unsaturated hydrocarbon stream obtained by oxidation-dehydrogenation to produce butadiene.

3. A process according to claim 2 wherein water wash is conducted to remove carbonyls from 1,3-butadiene.

References Cited

UNITED STATES PATENTS

| 3,281,489 | 10/1966 | Goering | 260—681.5 |
| 3,308,201 | 3/1967 | Bowers et al. | 260—681.5 |
| 3,336,414 | 8/1967 | Woerner | 260—681.5 |
| 3,536,775 | 10/1970 | Hutson et al. | 260—681.5 |
| 2,460,056 | 1/1949 | Yowell et al. | 260—681.5 |

DELBERT E. GANTZ, Primary Examiner

V. O'KEEFE, Assistant Examiner